(12) United States Patent
Huh et al.

(10) Patent No.: US 8,054,843 B2
(45) Date of Patent: Nov. 8, 2011

(54) METHOD FOR SECURING PRIVACY IN AUTOMATIC ANSWER MODE OF PUSH-TO SERVICE

(75) Inventors: Kang-Suk Huh, Seongnam-Si (KR); Sung Bum Choi, Incheon (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 11/808,081

(22) Filed: Jun. 6, 2007

(65) Prior Publication Data

US 2008/0037574 A1 Feb. 14, 2008

Related U.S. Application Data

(60) Provisional application No. 60/836,367, filed on Aug. 9, 2006.

(30) Foreign Application Priority Data

Feb. 27, 2007 (KR) ................. 10-2007-0019487
May 31, 2007 (KR) ................. 10-2007-0053035

(51) Int. Cl.
*H04L 12/28* (2006.01)
(52) U.S. Cl. ............... 370/401; 370/395.2; 455/519
(58) Field of Classification Search ............ 370/416, 370/328, 395.2, 352; 709/230, 227
See application file for complete search history.

(56) References Cited

U.S. PATENT DOCUMENTS

| 2004/0267939 A1* | 12/2004 | Yumoto et al. ............. 709/227 |
| 2005/0255811 A1 | 11/2005 | Allen et al. |
| 2005/0276268 A1* | 12/2005 | Poikselka et al. ......... 370/395.2 |
| 2006/0084454 A1 | 4/2006 | Sung et al. |
| 2006/0142037 A1 | 6/2006 | Sung et al. |
| 2006/0229095 A1* | 10/2006 | Sung et al. ............. 455/518 |
| 2007/0002831 A1* | 1/2007 | Allen et al. ............. 370/352 |
| 2007/0116233 A1* | 5/2007 | Onorato ............. 379/215.01 |
| 2007/0189203 A1* | 8/2007 | Sung et al. ............. 370/328 |
| 2007/0260739 A1* | 11/2007 | Buckley et al. ............. 709/230 |

* cited by examiner

*Primary Examiner* — John Pezzlo
*Assistant Examiner* — Matthew Campbell
(74) *Attorney, Agent, or Firm* — Birch, Stewart, Kolasch & Birch, LLP

(57) ABSTRACT

A method of securing an invited Push-To (PT) user's privacy in an automatic answer mode of a PT service is discussed. According to an embodiment of the present invention, a method for performing a PT (Push-To) service setting procedure, includes transmitting PT service setting information of a PT client to a PT server during a PT service setting procedure, the PT service setting information including answer mode setting information and privacy information, the answer mode setting information indicating if an answer mode of the PT client is an automatic answer mode or a manual answer mode, the privacy information indicating whether or not an identity of the PT client is to be kept private in the answer mode; and storing the PT service setting information of the PT client in the PT server, whereby the PT server can selectively inform identification information of the PT client to another PT client based on the privacy information.

5 Claims, 5 Drawing Sheets

FIG. 2

| Content-Type: | application/poc-settings+xml |
|---|---|
| XLM MIME BODY | `<?xml version="1,0" encoding="UTF-8"?>` |
| | `<poc-settings xmlns="urn:oma:params:xml:ns:poc:poc-settings"` |
| | `xmlns:xsi="http://www.w3.org/2001/XMLSchema-instance"` |
| | `xsi:schemaLocation="urn:oma:params:xml:ns:poc:poc-settings">` |
| | `<isb-settings>` |
| | `<incoming-session-barring active="false">` |
| | `</isb-settings>` |
| A { | `<am-settings>` |
| | `<answer-mode>automatic</answer-mode>` |
| | `</am-settings>` |
| | `<ipab-settings>` |
| | `<incoming-personal-alert-barring active="false"/>` |
| | `</ipab-settings>` |
| B { | `<privacy-setting>` |
| | `<privacy="anonymous"/>` |
| | `</privacy-setting>` |
| | `</poc-settings>` |

METHOD FOR SECURING PRIVACY IN AUTOMATIC ANSWER MODE OF PUSH-TO SERVICE

This application claims the priority benefits of U.S. Provisional Application No. 60/836,367 filed on Aug. 9, 2006, and Korean Patent Applications Nos. 10-2007-0019487 filed on Feb. 27, 2007 and 10-2007-0053035 filed on May 31, 2007 in Republic of Korea. The entire contents of each of these applications are herein incorporated by reference.

BACKGROUND OF THE INVENTION

1. Field of the Invention

The present invention relates to a session initiation protocol (SIP)-based session service, and more particularly, to a method of securing a respondent's privacy in an automatic answer mode of a push-to (PT) service and to any PT client terminal and/or server for implementing the method.

2. Discussion of the Related Art

A SIP is a signaling protocol prescribing procedures for allowing terminals to identify opposite terminals to communicate with and to find out locations thereof and for allowing the terminals to create, delete, and change multimedia service sessions. A SIP-based service has a request/response structure for controlling the establishment, correction, and release of the multimedia service session. The SIP-based service employs SIP URLs (Uniform Resource Locator) similar to e-mail addresses to identify users and thus provides services without dependence on IP (Internet Protocol) addresses.

An example of the SIP-based session service is a Push-To (PT) service. The PT service has been developed for providing fast communications between providers and users through mobile communication networks and generally includes such communication services wherein, among clients having set a session through a server, one client having a right of talk or a right of transmission assigned thereto transmits media data including voices or images and the other clients participating in the session receive the media data. The PT service includes a PoC (Push-to-talk Over Cellular) service of providing a call service to transmit voice data, a PTV (Push-To Video) service of transmitting image or video data, and a PTD (Push-To Data) service for transmitting various data. Voices, images, and data can be transmitted to one receiver (1-to-1) or a receiver group (1-to-many) such as in a group chat session.

In the PT service supporting a 1-to-1 communication and a group communication, individual privacies should be secured at the time of communication. More specifically, when the PT service is used, each user can select depending on his own intention whether his identity such as his nickname and/or his IP address should be open (not private) or anonymous (private). The individual intention on the publication of the user's identity (i.e., the identify of the user who has been invited to participate in a PT session) may be included as privacy information in a response message responding to a session invitation, which is then transmitted to the opposite party.

For example, the privacy information can be included in a header portion of a message 200 OK, which is a response message to a session invitation message, as a privacy header, and can be transmitted to an inviting PT server. The inviting PT server publishes or hides the identity of a respondent (invited PT user) to or from the inviting PT user on the basis of the privacy information included in the received response message. When the privacy information is not included in the received response message, the inviting PT server considers that the respondent (invited PT user) agrees to the publication of his identity to the inviting PT user or other PT users in the PT session.

However, in such a privacy securing method of the PT service according to the related art, the privacy of the respondent (invited PT user) might not be secured properly when the procedure is performed in an automatic answer mode. In the automatic answer mode, an automatic response message (e.g., a 183 SESSION PROGRESS message) not including the privacy information can be often transmitted "directly" to the inviting PT server through the invited PT server. Here, the term "directly" means that the automatic response message from the invited PT user is transmitted to the inviting PT server, regardless of the fact whether a response message (e.g., a message 200 OK) is received from the invited PT user having received a session invitation message. As a result, the inviting PT server does not receive or have the privacy information of the invited PT user in the automatic answer mode, and the identity of the invited PT user is made known to the inviting PT user (and maybe to other PT users) against the invited PT user's intention of keeping his identity private, which is a problem.

SUMMARY OF THE INVENTION

An advantage of some aspects of the invention is that it provides a method of securing privacy in an automatic answer mode of a PT service, in which a respondent's privacy can be secured by considering an invited PT user's intention on the publication of his identity in an automatic answer mode of the PT service.

An object of the present invention is to provide a method for controlling publication of a PT user's identity information in a PT service and to provide at least one PT client and at least one PT server for implementing the method, which address the limitations and disadvantages associated with the related art.

Another object of the invention is to provide a PT terminal and method of registering a PT user's privacy information in a PT service setting procedure and a method of utilizing the privacy information in an automatic answer mode of a PT service.

Another object of the invention is to provide a technique of prestoring a PT user's privacy information in an XDM (XML Database Management) server or other server and utilizing the prestored privacy information in a PT service, so as to provide a PT service in a manner that abides by the PT user's desire for privacy.

According to an aspect of the invention, there is provided a method of securing privacy in an automatic answer mode, the method including the steps in which: an invited PT server receives a session invitation message from an inviting PT server; and the invited PT client transmits an automatic response message, which contains privacy information of an invited PT client, to the inviting PT server in response to the session invitation message. The method of securing privacy in an automatic answer mode may further include a step in which the invited PT client sets the privacy information in the invited PT server during a PT service setting procedure.

According to another aspect of the invention, there is provided a method of securing privacy in an automatic answer mode, the method including the steps in which: an inviting PT server receives an automatic response message, which contains privacy information of an invited PT client, from an invited PT server; and the inviting PT server transmits a notification message, which contains identity information of the invited PT client corresponding to the privacy information, to an inviting PT client in response to the automatic response message.

According to a still another aspect of the invention, there is provided a method of securing privacy in an automatic answer mode, the method including the steps in which: a first PT client transmits a first session invitation message, which represents an invitation of a second PT client to a PT session, to a first PT server; the first PT server having received the first session invitation message transmits a second session invitation message to a second PT server; the second PT server transmits an automatic response message, which contains privacy information previously stored by the second PT client, to the first PT server in response to the second session invitation message; and the first PT server transmits a notification message, which contains identity information of the second PT client corresponding to the privacy information contained in the received automatic response message, to the first PT client.

According to an aspect, the present invention provides a method for performing a PT (Push-To) service setting procedure, comprising: transmitting PT service setting information of a PT client to a PT server during a PT service setting procedure, the PT service setting information including answer mode setting information and privacy information, the answer mode setting information indicating if an answer mode of the PT client is an automatic answer mode or a manual answer mode, the privacy information indicating whether or not an identity of the PT client is to be kept private in the answer mode; and storing the PT service setting information of the PT client in the PT server, whereby the PT server can selectively inform identification information of the PT client to another PT client based on the privacy information.

According to another aspect, the present invention provides a method for controlling transmission of privacy information, comprising: receiving, by a first PT (Push-To) server, a session invitation for inviting at least one second PT client to a PT session from a first PT client in an automatic answer mode; receiving, by the first PT server, a first message relating to a progress status of the session from a second PT server, the first message including privacy information of the at least one second PT client, the privacy information indicating whether or not an identity of the at least one second PT client is to be kept private; and transmitting, by the first PT server, a second message in response to the first message to the first PT client, wherein the second message selectively includes identification information of the at least one second PT client based on the privacy information.

According to another aspect, the present invention provides a method for controlling PT (Push-To) client identification information in a PT service, comprising: receiving, by a PT server, a session invitation message, wherein the session invitation message is a message inviting at least one second PT client to a session with a first PT client; determining, by the PT server, whether or not a privacy is requested by the at least one second PT client to keep an identification of the corresponding second PT client private; and transmitting, by the PT server, at least one response message in response to the session invitation message to another PT server, each of the at least one response message including a privacy parameter indicating whether or not the identification of the corresponding second PT client is to be kept private, wherein a value of the privacy parameter varies depending on results of the determining step.

According to another aspect, the present invention provides a method for controlling transmission of PT (Push-To) client identification information in a PT service, comprising: receiving, by a PT server, a first message for inviting a second PT client to a PT session, from a first PT client in an automatic answer mode; obtaining privacy information of the second PT client in response to the session invitation, the privacy information indicating whether or not an identity of the second PT client is to be kept private; and transmitting, by the PT server, a second message in the automatic answer mode to the first PT client based on the privacy information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 is a table illustrating an example of a SIP PUBLISH message including privacy information according to an embodiment of the invention;

DESCRIPTION OF EXEMPLARY EMBODIMENTS

Hereinafter, exemplary embodiments of the invention will be described in detail with reference to the attached drawings. The embodiments described below are intended to exemplify the technical spirit of the invention, but are not intended to limit the scope of the invention.

First Embodiment

A first embodiment of the present invention employs a PT service setting procedure. In the following description, a PT service setting procedure and a PT session invitation procedure performed subsequently to the PT service setting procedure according to the first embodiment of the present invention will be described in detail with reference to a PoC service. Accordingly, in the embodiments described below, PoC clients, PoC servers are shown and discussed. However, it should be clearly understood that these are given only as examples of PT clients and PT servers respectively for providing a PT service, and the present invention is not limited thereto. As such, the PoC client and PoC servers can be replaced with clients and servers for a PTV service or PTD service or may be combined therewith. That is, the invention fully encompasses any PT client, any PT server and/or other entity that provides a PT service which can include one or more of a PoC service, a PTV service, a PTD service, etc. Whenever the term "PoC" is used to describe the present invention, this is an example only, and this term is equally replaceable with the term "PT". Thus all the operations discussed below in connection with the PoC service are equally applicable in any other PT service according to the present invention.

PoC Service Setting Procedure

Figure 1:
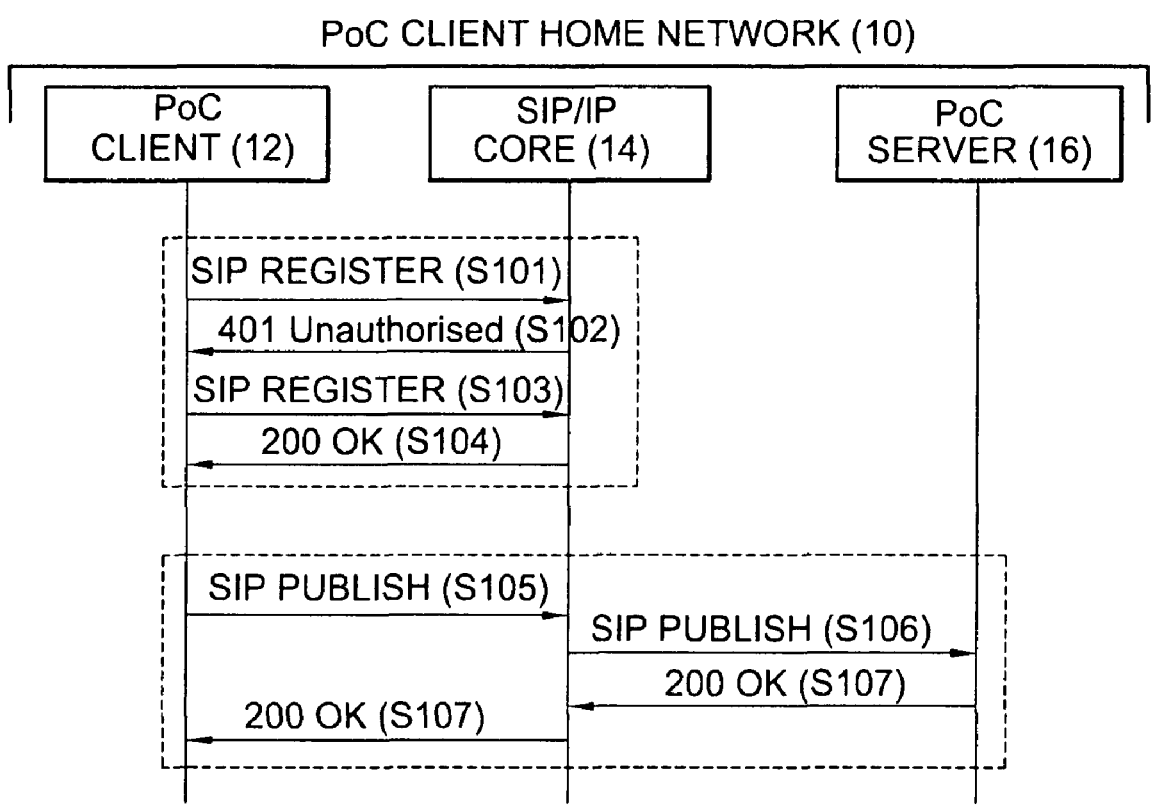
FIG. 1 is a diagram illustrating a flow of messages/signals in a PoC service setting procedure according to an embodiment of the invention.

FIG. 1 is a diagram illustrating a flow of messages in a PoC service setting procedure according to an embodiment of the invention, which is an example of a procedure of performing a PoC service setting process to a PoC server 16 by allowing a PoC client 12 to transmit and receive signals to and from the PoC server 16 through a SIP/IP core 14 in a PoC client home network 10. All the components are operatively coupled and configured.

According to an embodiment, the PoC client (PT client) 12 is a processor module mounted on a user equipment (UE) (or terminal) so as to perform processes associated with the PoC service (PT service), and is a function unit for supporting the PoC service of the UE. The UE may be a fixed device or a mobile device, and the types or names thereof are not particularly limited. For example, the UE may be a mobile station (MS) or a laptop computer or a PDA (Personal Digital Assistant) having a PoC client function built therein. The UE may be called a user terminal (UT), a PT terminal, a mobile station (MS), a subscriber station, a wireless device, or the like.

The SIP/IP core 14 is generally a set of nodes for providing a variety of IP-based multimedia services and performing a session control process in the environment of mobile communication network, and may be a 3GGP ($3^{rd}$ Generation Project Partnership) or an IMS (IP Multimedia Subsystem) of 3GPP2. The PoC server (PT server) 16 is a server of a system for supporting the PoC service in the PoC client home network 10 which is a home network of a setter (respondent).

Referring to FIG. 1, the PoC client 12 which is to perform a PoC service setting procedure first performs a login procedure (S101 to S104) with the SIP/IP core 14. The login procedure of the PoC client 12 can be embodied by the use of a normal signal transmission procedure and one example thereof is shown in FIG. 1.

When the PoC client 12 transmits a registration request message such as a SIP REGISTER message to the SIP/IP core 14 (S101), the SIP/IP core 14 transmits an unauthorized response message such as a 401 UNAUTHORIZED message to the PoC client 12 (S102). The PoC client 12 having received the 401 UNAUTHORIZED message transmits again a registration request message such as a SIP REGISTER message to the SIP/IP core 14 (S103). Then, the SIP/IP core 14 transmits a response message such as a 200 OK message indicating the acceptance of registration. In this way, the login procedure is completed.

Subsequently, the PoC client 12 having completed the login procedure performs a PoC service (PT service) setting procedure (S105 to S108). The PoC service setting procedure is a procedure of allowing a user of the PoC client 12 to select and set in advance a variety of service settings for processing a PoC session (PT session) such as a response mode, and then the selected service settings for the PoC client 12 are stored in the PoC server 16 of the home network 10. The PoC service setting procedure may be generally performed to initially set, update, or refresh the variety of service settings in the PoC server 16.

In the PoC service setting procedure, the PoC client 12 first creates a message including PoC service setting information (hereinafter, also referred to as "service setting message") associated with the PoC client 12 (or its user) and transmits the created service setting message to the SIP/IP core 14 (S105). The SIP/IP core 14 transmits again the received service setting message to the home PoC server 16 of the PoC client 12 (S106). That is, the service setting message is transmitted from the PoC client 12 to the PoC server 16 through the SIP/IP core 14.

A SIP PUBLISH message can be used as the service setting message, but the service setting message is not limited to the SIP PUBLISH message and can be other message. The PoC server 16 transmits an acknowledge message or a response message (e.g., a 200 OK message) responsive to the received service setting message to the PoC client 12 through the SIP/IP 14 (S107 and S108). The PoC server 16 stores the PoC service setting information included in the service setting message therein.

The PoC service setting information provided in the service setting message includes answer mode information and incoming PoC session barring information for the PoC client 12. In the embodiment of the invention, the PoC service setting information further includes privacy information. The privacy information is information indicating whether or not the respondent's identity should be made open to the opposite party(ies). For instance, the privacy information indicates whether the identity information of the PoC client 12 (or its user) who is invited to a PT session should be kept private or should be made public to one or more other PT users/clients (e.g., an inviting PT user). Based on the stored privacy information, the PoC server 16 or another PT server can decide whether or not to disclose the identify of the PoC client 12 to one or more other PT clients in a PT session. Since the privacy information of the PoC client 12 is provided to the PoC server 16 during the PoC service setting procedure, this allows the respondent's (PoC client 12's) privacy to be secured even when a response is made in an automatic answer mode which will be described later in more detail.

According to the embodiment of the invention, the privacy information can be transmitted to the PoC server 16 from the PoC client 12 with the privacy information being included in a header portion or a body portion of the service setting message. For example, when a SIP PUBLISH message is used as the service setting message, the privacy information may be included in a header portion of the SIP PUBLISH message as a privacy header or in a body portion of the SIP PUBLISH message in a predetermined message format.

FIG. 2 shows an example of the SIP PUBLISH message including the privacy information according to an embodiment of the present invention. In this example, the privacy information is included in the body portion of the SIP PUBLISH message.

Referring to FIG. 2, it can be seen that the body portion of the SIP PUBLISH message includes privacy information B in addition to answer mode information A. The answer mode information A in this example is represented with a parameter/element <answer-mode>. If the answer mode information A indicates "automatic" (e.g., the value of <answer-mode> is 'automatic', then this means that the respondent (e.g., PoC client 12) has set an answer mode to be an automatic answer mode. Generally, a PT user can set the answer mode of a PT session to be an automatic answer mode or a manual answer mode. If the answer mode information A indicates "manual" (e.g., the value of <answer-mode> is 'manual'), then the answer mode is set to be the manual answer mode.

The privacy information B in this example is represented with a parameter/element <privacy-setting>. If the privacy information B is expressed as or indicates "anonymous" (e.g., the value of "privacy" is 'anonymous' under the <privacy-setting> element), this means that the respondent does not want to publish his identity. As a variation, "id" may be used instead of "anonymous." On the contrary, when the privacy information B is expressed as or indicates "open" or "none", it represents that the respondent agrees to publish his identity.

As described above with reference to the PoC service, according to the embodiment of the invention, a PT user can set in advance whether his identity should be made open (disclose it) or should be kept anonymous (do not disclose it), in a home PT server according to his intention. In addition, since the privacy information conveniently is included in a message that is used in an existing PT service setting procedure, it is not necessary to create a new message and/or add an additional signal transmission procedure for transmitting the privacy information to the PT server.

PoC Session Invitation Procedure

Next, a procedure of allowing a first PoC user to invite at least one second PoC user (one or more PoC users) to a PoC session and to start an interaction therebetween according to a first embodiment of the invention will be described with reference to FIG. 3. Here, the second PoC user has stored in advance the PoC service setting information including the answer mode information and the privacy information of the second PoC user, in the second PoC server by the use of the "PoC service setting procedure" as discussed above in connection with FIG. 1 according to the invention. As an example only, in FIG. 3, it is assumed that the answer mode of a second PoC client 32 (second PoC user) is set as "automatic answer mode" and the privacy information of the PoC client 32 is set as "anonymous" (or "id").

Figure 3:
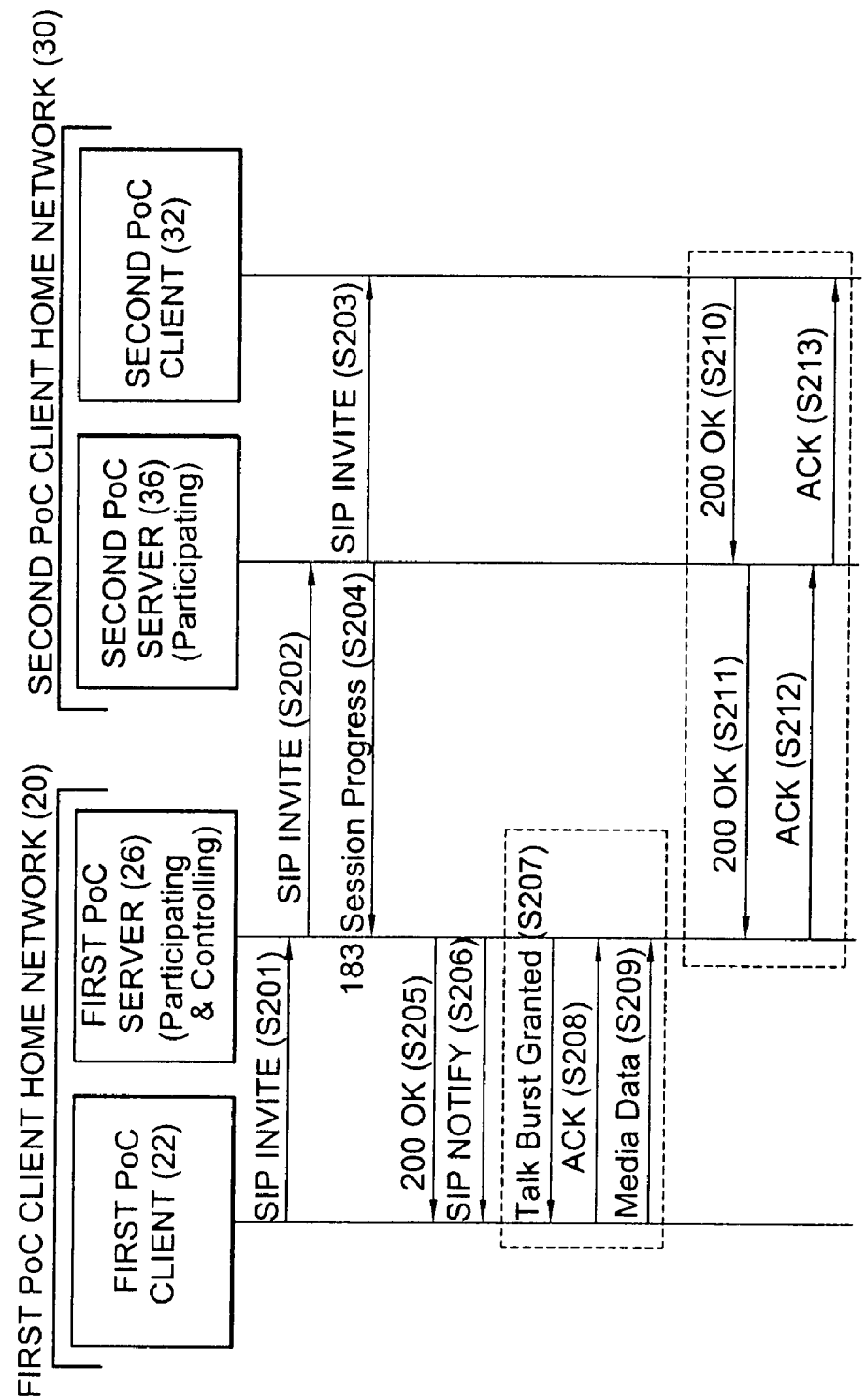
FIG. 3 is a diagram illustrating a flow of messages/signals in a PoC session invitation procedure according to an embodiment of the invention.

FIG. 3 shows an example where a first PoC client 22 and the second PoC client 32 use different PoC servers as the home server. Unlike this example, the first and second PoC clients 22 and 32 may use the same PoC server as the home server. In this case, the step of allowing a first PoC server 26 and a second PoC server 36 to interchange messages therebetween, for example, steps S202 and S204 to be described later, may be internally performed in a PoC server. Also, for the sake of simplicity, in the example of FIG. 3, the first PoC client 22 invites one PoC client (i.e., second PoC client 32) to a PT session. However, the first PoC client 22 can invite multiple PoC clients to a PT session at a time and FIG. 3 encompasses such scenario.

Referring to FIG. 3, the first PoC client 22 first transmits a session invitation message (e.g., a PT session invitation) to the first PoC server 26 through a first SIP/IP core (not shown) (S201). The session invitation message may be a SIP INVITE message, but can others. Here, the first PoC client 22 is an example of the PoC client 12 described above with reference to FIG. 1 and a functional unit for performing the PoC service in an inviting PoC user's UE, that is, an inviting PoC client.

The first PoC server 26 is a server of a system for supporting the PoC service in a first PoC client home network 20 which is an inviting user's home network, that is, an inviting PoC server. The inviting PoC server 26 may be a PoC server for performing a participating PoC function (PF) and a controlling PoC function (CF) together. A PF unit (which is a server for performing the PF function of the first PoC server 26) and the CF unit (which is a server for performing the CF function) may be physically combined with each other or separated from each other.

When the session invitation message is transmitted to the first PoC server 26, the types of a PoC session which can be requested for by the first PoC client 22 are not particularly limited. For example, the first PoC client 22 can request for a PoC session so as to invite members subscribed in a previously organized PoC group thereto. The first PoC client 22 may request for a pre-arranged PoC group session in which all members of the corresponding group are invited by designating an address of the group (for example, sip:OMA-Golf-buudies@networkX.net). The pre-arranged PoC group session may be a typical 1-many PoC session in which all the participated members have the same right or a 1-many-1 PoC session in which one participated member has a special right different from those of the other participated members. Other types of PT sessions are possible and covered by the present invention.

The first PoC client 22 may request for the PoC session in which specific members are directly designated at the time of transmitting the session invitation message. In this case, the first PoC client 22 may designate directly an identity of one or more opposite parties to be invited to the PoC session by the use of data stored in a phone book in the UE having the first PoC client 22. More specifically, the first PoC client 22 may request for an Ad-hoc PoC group session in which the members of the group to be invited are directly designated or for a 1-1 PoC session in which only one opposite party is designated.

Next, the first PoC server 26 transmits the session invitation message such as a SIP INVITE message to the second PoC server 36 which is an opposite PoC server (S202). Here, the second PoC server 36 is a PoC server constituting a second PoC client home network 30, which is a home network of the invited PoC user, that is, an invited PoC server. The invited PoC server 36 may be a PoC server for performing only the participating PoC function. As described above, when the second PoC client 32 uses the same PoC server as the first PoC client 22 as the home server, step S202 is carried out internally.

If a session request from the first PoC client 22 corresponds to a pre-arranged PoC session request, the first PoC server 26 communicates with an XDM (XML Database Management) server that stores therein the identity information of the members belonging to the requested group to acquire the identity information of the invited PoC users, and then transmits the session invitation message to the corresponding PoC server(s) of the invited PoC users.

Next, the second PoC server 36 checks that the received message is associated with the second PoC user and then transmits the session invitation message to the second PoC client 32 (the invited PoC client) (S203). The session invitation message may be also the same or similar SIP INVITE message.

Subsequently, just after the session invitation message is transmitted to the second PoC client 32 in step S203, the second PoC server 36 transmits an automatic response message to the first PoC server 26 in accordance with a signal processing procedure corresponding to the automatic answer mode set by the second PoC user (S204). That is, the second PoC server 36 can check the answer mode information (e.g., the answer mode information A stored through the procedure of FIG. 1) of the second PoC client 32 and determines that the answer mode is in the automatic answer mode. Then the second PoC server 36 transmits an automatic response message (which is preferably used in the automatic answer mode) to the first PoC server 26 in step S204. The automatic response message can be transmitted to the first PoC server 26 from the second PoC server 36 before step S210 of receiving a response message responsive to the session invitation message from the second PoC client 32. The automatic response message may be a 183 SESSION PROGRESS message, but can be other type. As described above, when the second PoC client 32 and the first PoC client 22 use the same PoC server as a home server, the process of step S204 is carried out internally. The order in which steps S203 and S204 are performed can vary or these steps can be performed simultaneously.

According to this embodiment, the automatic response message (e.g., '183 SESSION PROGRESS' message) of the automatic answer mode in step S204 includes the privacy information of the second PoC user (second PoC client 32), which is stored in advance in the second PoC server 36 by the second PoC user (that is, the second PoC client 32) at the time of setting the PoC service. For example, the privacy information associated with the second PoC client 32 can be included in a header portion of the automatic response message as a privacy header or may be included in a body portion of the automatic response message with a different format (for example, a format of "B" in FIG. 2). In this way, according to the embodiment of the invention, even when a response (e.g., the automatic response message in step S204) is made in the automatic answer mode before step S210 of receiving a response message responsive to the session invitation message from the second PoC client 32, the privacy information (of the second PoC user) previously set by the second PoC user is included in the response message transmitted to the first PoC server 26 from the second PoC server 36 in step S204. That is, the privacy information of the second PoC user can be prestored in the PoC server 36 in the PoC service setting procedure of FIG. 1, and indicates whether or not the identity information (e.g., nick name, password, telephone number, etc.) of the second PoC user should be kept private or should be made public to the first PoC user and/or to other PoC user(s).

According to another aspect of the invention, only when the privacy information of the second PoC user stored in the second PoC server 36 indicates "anonymous" (or "id"), the privacy information indicating the same meaning is included in the automatic response message, e.g., in step S204. When the privacy information of the second PoC user stored in the second PoC server 36 indicates "open" (or "none"), the privacy information indicating the same meaning can be included in the automatic response message or may not be included in the automatic response message. If the privacy information is not included in the automatic response message, it is considered that the second PoC user agrees to the publication of his identity.

Subsequently, the first PoC server 26 having received the automatic response message from the second PoC server 36 in the automatic answer mode transmits a response message (for example, a 200 OK message) to the first PoC client 22 (S205). The response message in step S205 indicates that the second PoC client 32 accepts the invitation to the session). In this case, the second PoC client 32 may not transmit an acceptance message (for example, the 200 OK message in step S210) directly to the first PoC client 22, but the first PoC server 26 receives the automatic response message (e.g., a 183 SESSION PROGRESS message) transmitted from the second PoC server 36, which is interpreted to mean that the second PoC client 32 accepts the invitation, and sends the response message (e.g., 200 OK) to the first PoC client 22 in step S205

Next, the first PoC server 26 notifies the first PoC client 22 of the invitation result indicating who has accepted the invitation among the members being invited (S206). The invitation result can be notified using a notification message such as a SIP NOTIFY message. More specifically, the first PoC server 26 may include: (a) the identity information of the second PoC client 32 having accepted the invitation and (b) information indicating a current connection status (for example, "connected" or "dialing-out") in the body portion of the SIP NOTIFY message on the basis of a type of the received response message (for example, a message 183 SESSION PROGRESS) and information included therein. The first PoC server 26 then transmits the SIP NOTIFY message to the first PoC client 22 (S206). Here, the "identity information" can indicate directly an ID of the second PoC client 32 which is the invited PoC client or can indicate that the identity of the respondent is "anonymous" (for example, "anonymous" or "id").

For example, when the privacy information of the second PoC user/client 32 included in the 183 SESSION PROGRESS message received from the second PoC server 36 in step S204 represents "anonymous" (or "id" or other designated value indicating that the identity information should be kept private), the first PoC server 26 can create a notification message including (i) information indicating that a certain PoC user is connected among the members to be invited (for example, "connected" or "dialing-out") and (ii) information indicating that the connected PoC user is "anonymous". And the first PoC server 26 transmits the created notification message to the first PoC client 22 in step S206, which can be, e.g., displayed to the first PoC user (user of the first PoC client 22). Here, the information (i) indicating that a certain PoC user is connected among the members to be invited includes preferably a <status> element which can have a 'dialing-out' value, a 'connected' value, etc. for indicating a status of a session. The information (ii) can be the identity information of the second PoC user if the second PoC user's privacy information indicates "open" or "none", or can be an indication that informs the first PoC user that the second PoC user's identity is not know or is "anonymous" if the second PoC user's privacy information indicates "anonymous" or "id". On the contrary, when the privacy information included in the received 183 SESSION PROGRESS message represents "open" (or "none" or any other designated value indicating that the identity information need not be kept private), the first PoC server 26 creates a notification message including information indicating that a certain PoC client is connected (for example, "connected" or "dialing-out") along with the ID (or other identity information) of the connected PoC client. And the first PoC server 26 transmits the created notification message to the first PoC client 22 in step S206.

Thereafter, steps S207 to S209 are performed in which the first PoC server 26 assigns a right of talk (right to send media data) to the first PoC client 22, and the first PoC client 22 transmits media data and the like to the first PoC server 26 under the assigned right. Steps S207 to S209 in FIG. 3 show an example of a call starting procedure.

Steps S210 to S213 in FIG. 3 show an example of a procedure in which the second PoC client 32 transmits a response message (e.g., 200 OK message) responsive to the session invitation message received in step S203 to the first PoC server 26 through the second PoC server 36 (S210 and S211) and the second PoC client 32 receives an acceptance message (e.g., ACK message) responsive to the response message from the first PoC server 26 (S212 and S213). The specific time for performing steps S210 to S213 is variable depending on a network environment or a response time of the second PoC user. For example, steps S210 to S213 may be performed before step S207 or may be performed before step S206 or step S205 in some cases.

As described above with reference to the PoC service, in the PT session invitation procedure according to the embodiment of the invention, the privacy information is included in the automatic response message transmitted from the invited PT server to the inviting PT server, in the automatic answer mode. The inviting PT server creates the notification message including the information indicating that a respondent is connected and the information indicating either the respondent's ID (identity information) or "anonymous" corresponding to the received privacy information, and transmits the created notification message to the inviting PT client. Therefore, according to the invention, even when the PT service is set to the automatic answer mode, it is possible to prevent the invited user's ID (or other identity information of the invited user) from being published against the invited user's intention.

Second Embodiment

A second embodiment of the invention employs a PT user's preference information stored in an XDM (Xml Database Management) server. In the following description, a method of securing privacy in a procedure of storing the PT user's preference information and in a PT session invitation procedure performed subsequently to the procedure of storing the preference information according to the second embodiment of the invention will be described in detail with reference to the PoC service. Accordingly, in the embodiments described below, PoC clients, PoC servers are shown and discussed. However, it should be clearly understood that these are given only as examples of PT clients and PT servers respectively for providing a PT service, and the present invention is not limited thereto. As such, the PoC client and PoC servers can be replaced with clients and servers for a PTV service or PTD service or may be combined therewith. That is, the invention fully encompasses any PT client, any PT server and/or other entity that provides a PT service which can include one or more of a PoC service, a PTV service, a PTD service, etc. Whenever the term "PoC" is used to describe the present invention, this is an example only, and this term is equally replaceable with the term "PT". Thus all the operations discussed below in connection with the PoC service are equally applicable in any other PT service according to the present invention.

Preference Information Storing Procedure

Figure 4:
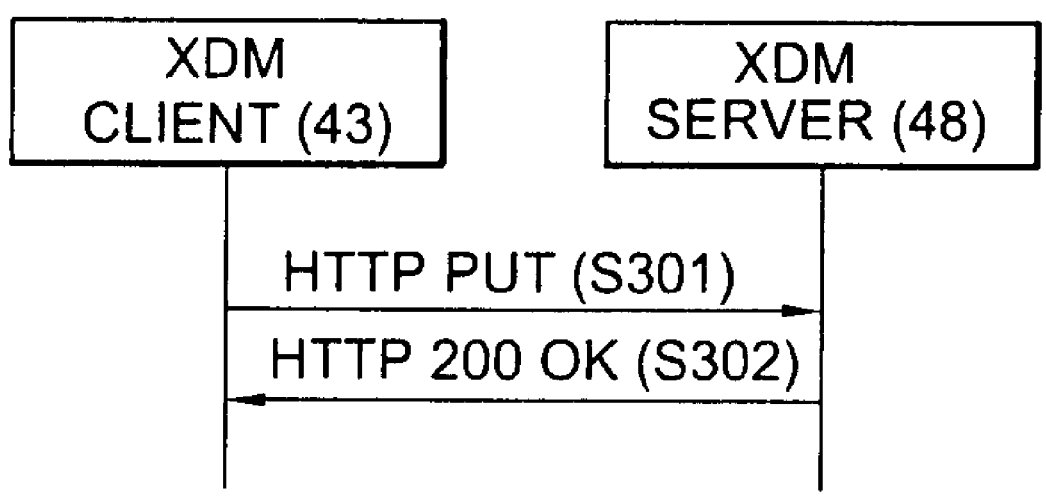
FIG. 4 is a diagram illustrating a flow of messages/signals in a process of storing a PoC user's preference information in an XDM server according to an embodiment of the invention.

FIG. 4 is diagram illustrating a flow of signals in a procedure of storing the PoC user's preference information in an XDM server 48 by allowing an XDM client 43 to transmit and receive signals to and from the XDM server 48 through an XCAP (Xml Configuration Access Protocol) in a home network. Here, as an example only, the XDM client 43 is a functional unit mounted on a user equipment (UE) and also is a module for performing data processes associated with the PoC service, similarly to the PoC client. The XDM client 43 can be viewed as a PT client (e.g., the second PoC client 32 in FIG. 3). The XDM server 48 is a data management server for supporting the PoC service in the PoC client home network.

Referring to FIG. 4, the XDM client 43 creates a transmission message including preference information of a PoC user of the XDM client 43, and transmits the created transmission message to the XDM server 48, e.g., through an aggregation proxy or network (S301). A message using the XCAP such as an HTTP PUT message can be used as the transmission message, but the transmission message is not limited to the HTTP PUT message and can be other type. That is, the HTTP PUT message including the PoC user's preference information is transmitted from the XDM client 43 to the XDM server 48. The XDM server 48 then transmits a response message (e.g., a 200 OK message) to the XDM client 43 (S302). The XDM server 48 stores the PoC user's preference information included in the received transmission message therein.

According to this embodiment of the invention, the PoC user's preference information included in the transmission message in step S301 includes privacy information. For instance, the HTTP PUT message in step S301 includes the privacy information of the PoC user as part of the preference information to be stored in the XDM server 48. As mentioned above in connection with the information B shown in FIG. 2, the privacy information is information indicating whether the respondent's identity is to made either open or anonymous to the opposite party. Accordingly, even when a response responsive to the session invitation message is made in the automatic answer mode, it is possible to secure a respondent's privacy information according to the respondent's desire.

According to an aspect of this embodiment, the privacy information can be transmitted from the XDM client 43 to the XDM server 48 in a state where the privacy information is included in a header portion or a body portion of the transmission message. For example, when an HTTP PUT message is used as the transmission message, the privacy information may be included either in a header portion of the HTTP PUT message as a privacy header or in a body portion of the HTTP PUT message in a predetermined format.

As described above with reference to the PoC service, according to the second embodiment of the invention, the PT user can store information indicating his desire to either publish or not publish his identity in the home XDM server. In addition, since such privacy information can be transmitted by using the existing procedure of storing the PT user's preference information, it is unnecessary to create a new type of message and/or to add a particular signal transmission procedure for the purpose of transmitting and storing such privacy information.

PoC Session Invitation Procedure

Next, a procedure of allowing the first PoC user to invite at least one second PoC user to a PoC service and starting an interaction according to the second embodiment of the invention will be described with reference to FIG. 5. Here, the second PoC user stores in advance the privacy information of the second PoC user and the like in the XDM server in accordance with the "preference information storing procedure" discussed above in connection with FIG. 4. For example, the privacy information may be stored as being either "anonymous" (or "id") or "open" (or "none"). The second PoC user sets the automatic answer mode in accordance with the PoC service setting procedure of FIG. 1, similarly to the first embodiment. As an example only, in FIG. 5, it is assumed that the answer mode of a second PoC client 62 (second PoC user) is set as "automatic answer mode." Also, for the sake of simplicity, in the example of FIG. 5, a first PoC client 52 invites one PoC client (i.e., second PoC client 62) to a PT session. However, the first PoC client 52 can invite multiple PoC clients to a PT session at a time and FIG. 5 encompasses such scenario. Hereinafter, differences from the first embodiment will be highlighted in detail.

Figure 5:
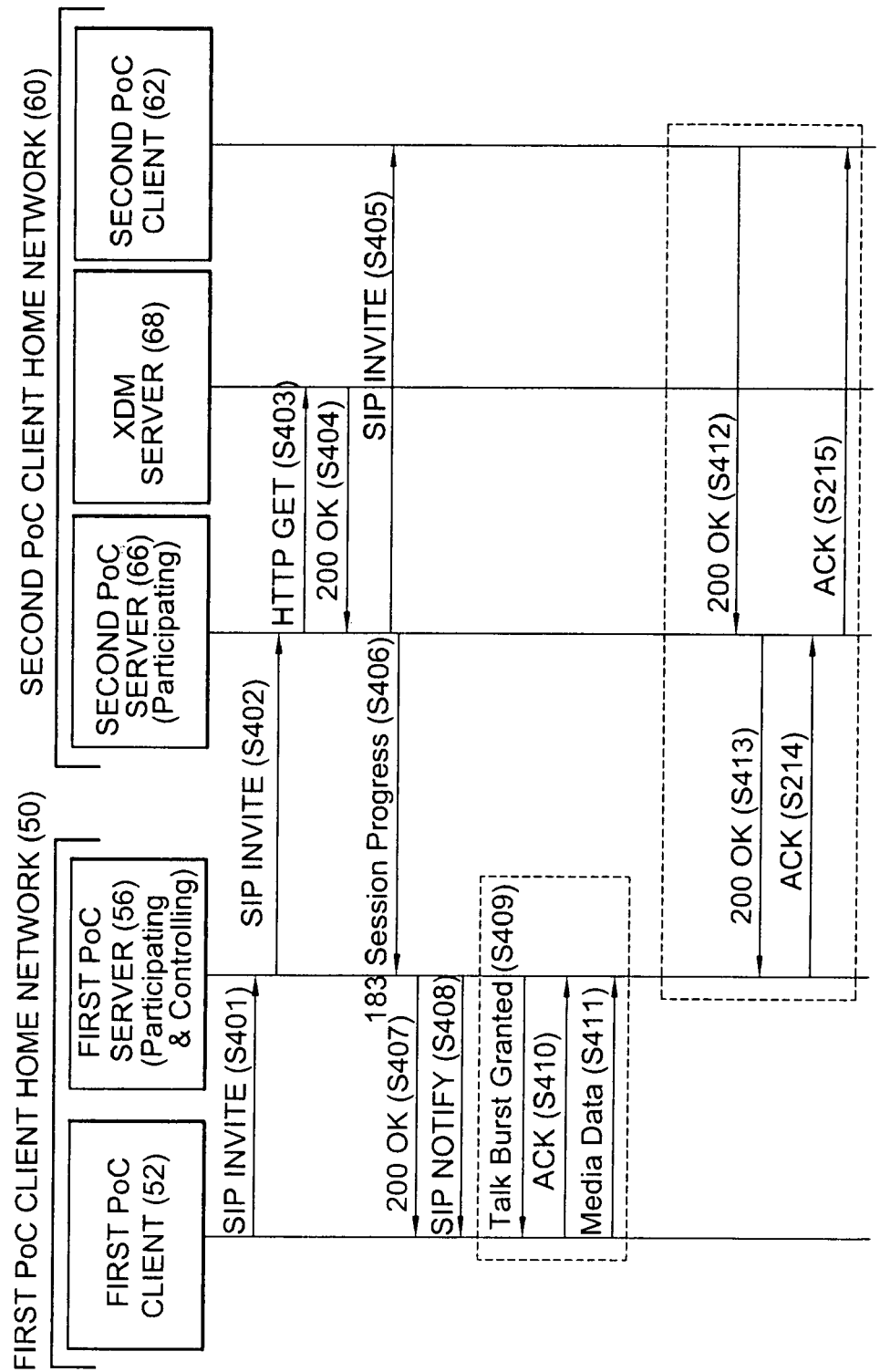
FIG. 5 is a diagram illustrating a flow of messages/signals in a PoC session invitation procedure according to another embodiment of the invention.

Referring to FIG. 5, the first PoC client 52 first transmits a session invitation message (e.g., a SIP INVITE message) to a first PoC server 56 through a first SIP/IP core (not shown) (S401). The first PoC server 56 then transmits the session invitation message (e.g., a SIP INVITE message) to a second PoC server 66 which is the opposite PoC server (S402).

Subsequently, the second PoC server 66 determines that the received message is a message for the second PoC user, and transmits an XCAP message such as HTTP GET for acquiring the second PoC user's preference information (e.g., the privacy information of the second PoC user as stored in FIG. 4) to the XDM server 68 (S403). Then, the XDM server 68 transmits the response message such as an HTTP 200 OK message responsive to the XCAP message to the second PoC server 66 (S404). Here, the second PoC user's privacy information is included in the header portion or the body portion of the response message, i.e., 200 OK message, in step S404. The second PoC server 66 transmits a session invitation message such as a SIP INVITE message to the second PoC client 62 (S405). Although it has been shown in FIG. 5 that step S405 is performed after step S404, this is only an example and thus the order of steps S404 and S405 may be inverted or these steps may be performed at the same time.

Subsequently, just after transmitting the session invitation message to the second PoC client 62 in step S405, the second PoC server 66 transmits an automatic response message to the first PoC server 56 in accordance with the signal processing procedure corresponding to the automatic answer mode set by the second PoC user (S406). That is, the second PoC server 66 can check the answer mode information (e.g., the answer mode information A stored through the procedure of FIG. 1) of the second PoC client 62 and determines that the answer mode is in the automatic answer mode. Then the second PoC server 66 transmits an automatic response message (which is preferably used in the automatic answer mode) to the first PoC server 56 in step S406. The automatic response message may be a 183 SESSION PROGRESS message, but can be others. According to this embodiment, the automatic response message in step S406 includes the privacy information acquired from the XDM server 68 using the HTTP GET message in steps S403 and S404. In this way, even when a response is made in the automatic answer mode before the response message responsive to the session invitation message is received from the second PoC client 52 in S412, the privacy information stored in advance by the second PoC user can be included in the response message transmitted from the second PoC server 66 to the first PoC server 56 in step S406.

Subsequently, the first PoC server 56 having received the automatic response message (e.g., 183 SESSION PROGRESS message in step S406) from the second PoC server 66 in the automatic answer mode transmits a response message (e.g., a 200 OK message), which indicates that the second PoC client 62 accepts the invitation to a PT session, to the first PoC client 52 (S407). The first PoC server 56 then notifies the invitation result, which indicates who accepts the invitation among the members to be invited, to the first PoC client 52 by the use of a notification message such as a SIP NOTIFY message (S408). The notification message in step S408 preferably includes information on a connection status of the second PoC client 62 as well as identity information (information indicating either the second PoC client's ID (identity information) or "anonymous") on the basis of the privacy information included in the received response message (e.g., 183 SESSION PROGRESS). That is, similar to step S206, the notification message in step S408 includes the information on the connection status of the second PoC client 62, and such information preferably includes a <status> element which can have a 'dialing-out' value, a 'connected' value, etc. for indicating a status of a session.

Thereafter, steps S409, S410 and S211 in which the first PoC server 56 assigns a right of talk (right to send media) to the first PoC client 52 and the first PoC client 52 transmits media data and the like to the first PoC server 56 under the assigned right, are performed in accordance with a normal procedure. Steps S409 to S411 in FIG. 5 show an example of such a call starting procedure. Also steps S412 to S415 are performed, which is an example of a procedure in which the second PoC client 62 transmits a response message responsive to the session invitation message received in step S405 to the first PoC server 56 through the second PoC server 66, and receives an acceptance message responsive to the response message from the first PoC server 56 through the second PoC server 66.

As described above with reference to the PoC service, the automatic response message transmitted from the invited PT server to the inviting PT server includes the privacy information of the invited PT user in the PT session invitation procedure. The inviting PT server creates a notification message, which contains the respondent's (e.g., invited PT user's) identity or the information indicating "anonymous" corresponding to the received privacy information, and transmits the created notification information to the inviting PT client. Accordingly, according to the invention, even when the PT service is set in the automatic answer mode, it is possible to prevent the invited PT user's identity from being published to the inviting user against the intention of the invited PT user by using the privacy information of the invited user. The privacy information of the invited PT user can be stored through the PT service setting procedure or in an XDM server as part of the invited PT user's preference information.

As described in detail above, in the PT session invitation procedure according to the invention, the automatic response message transmitted from the invited PT server to the inviting PT server (e.g., when the PT service is set in the automatic answer mode) contains the privacy information corresponding to a privacy value previously set or stored by the respondent. And the inviting PT server creates a notification message, which contains the information indicating a connection of a respondent (e.g., <status> element) and the information indicating either the respondent's ID (identity information) or "anonymous", and then transmits the created notification message to the inviting PT client. Therefore, according to the invention, even when the PT service is processed according to the previously set automatic answer mode, the present invention effectively prevents the invited user's ID (identity information) from being published against the invited user's intention. That is, the PT server determines whether or not to keep the invited user's identity information private based on the stored privacy information of the invited user, and selectively discloses the invited user's identity information to one or more other PT users according to this determination. This is especially beneficially and effective when the PT service is in the automatic answer mode.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A Push-To (PT) session method between a first PT client and at least one of multiple second PT clients, the method comprising:

receiving, by a first PT server, from the first PT client, a session invitation for inviting the at least one of the multiple second PT clients to a PT session with the first PT client;

forwarding the session invitation, by the first PT server, to the at least one of the multiple second PT clients via a second PT server;

wherein the second PT server stores a service setting for the at least one of the multiple second PT clients, the service setting including answer mode information and privacy information, the answer mode information indicating that the at least one of the multiple second PT clients is in an automatic answer mode, and the privacy information indicating whether or not an identity of the at least one of the multiple second PT clients is to be kept private;

in response to the forwarded session invitation, receiving, by the first PT server, from the second PT server, a SIP (Session Initiation Protocol) 183 Session Progress message relating to a progress status of the session, the SIP 183 Session Progress message including a privacy parameter in accordance with the privacy information of the at least one of the multiple second PT clients; and transmitting, by the first PT server, to the first PT client, a SIP NOTIFY message in response to the SIP 183 Session Progress message, wherein the SIP NOTIFY message indicates that the identity of the at least one of the multiple second PT clients is anonymous if the privacy parameter indicates that the identity of the at least one of the multiple second PT clients is to be kept private.

2. The method of claim 1, wherein the SIP NOTIFY message further includes connection status information indicating a current connection status of the session.

3. The method of claim 1, wherein the SIP NOTIFY message includes the identification information of the at least one of the multiple second PT clients if the privacy information indicates that the identity of the at least one of the multiple second PT clients is not to be kept private.

4. The method of claim 1, wherein the SIP NOTIFY message includes a <status> element having a 'dialing-out' value.

5. The method of claim 1, wherein the privacy parameter is provided in a header of the SIP 183 Session Progress message.

\* \* \* \* \*